J. F. WHITE.
FLEXIBLE TRANSMISSION AND STARTING DEVICE FOR EXPLOSIVE ENGINES.
APPLICATION FILED FEB. 13, 1909.
1,104,593.
Patented July 21, 1914.
5 SHEETS—SHEET 1.
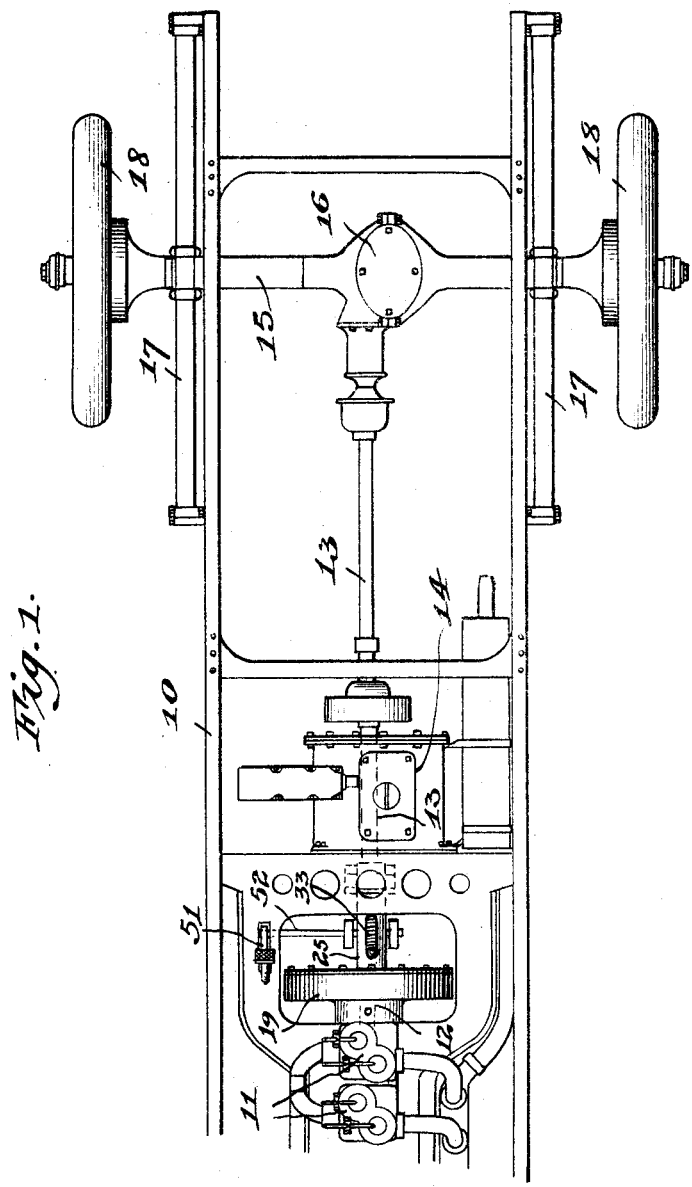

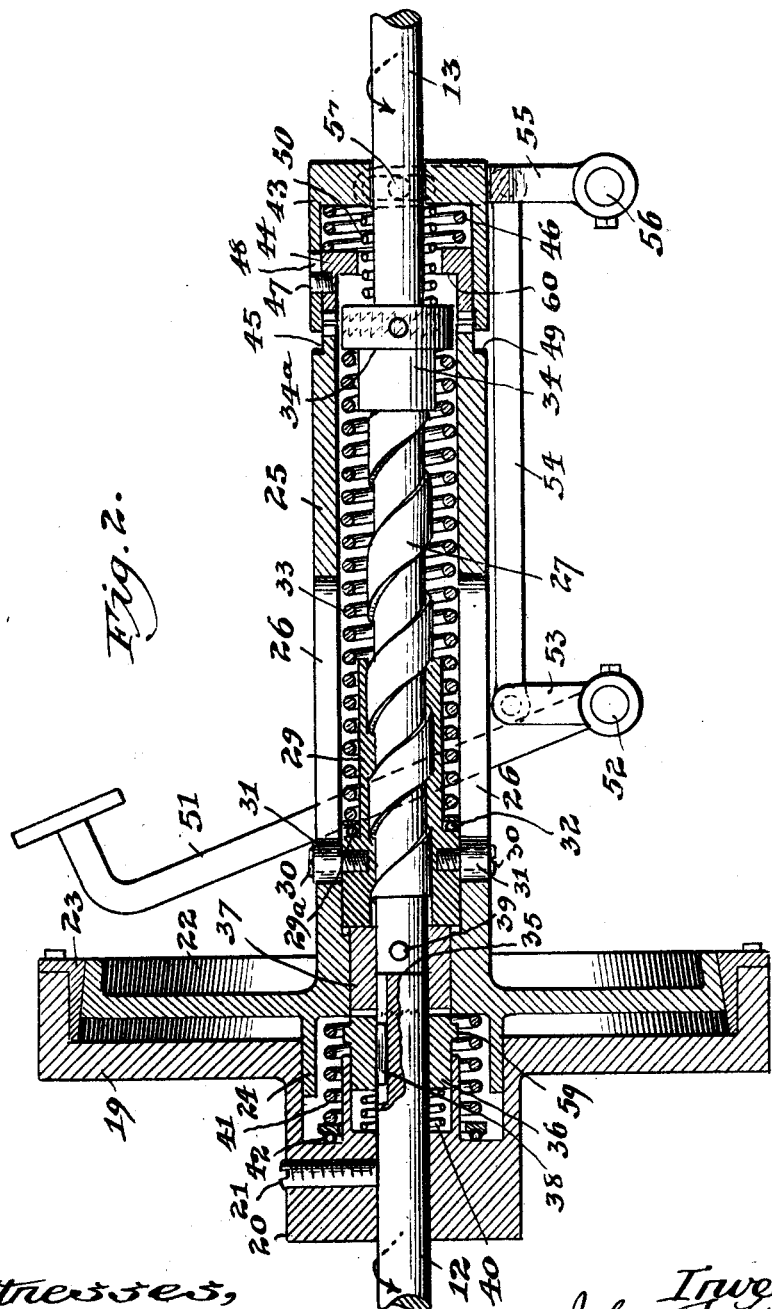

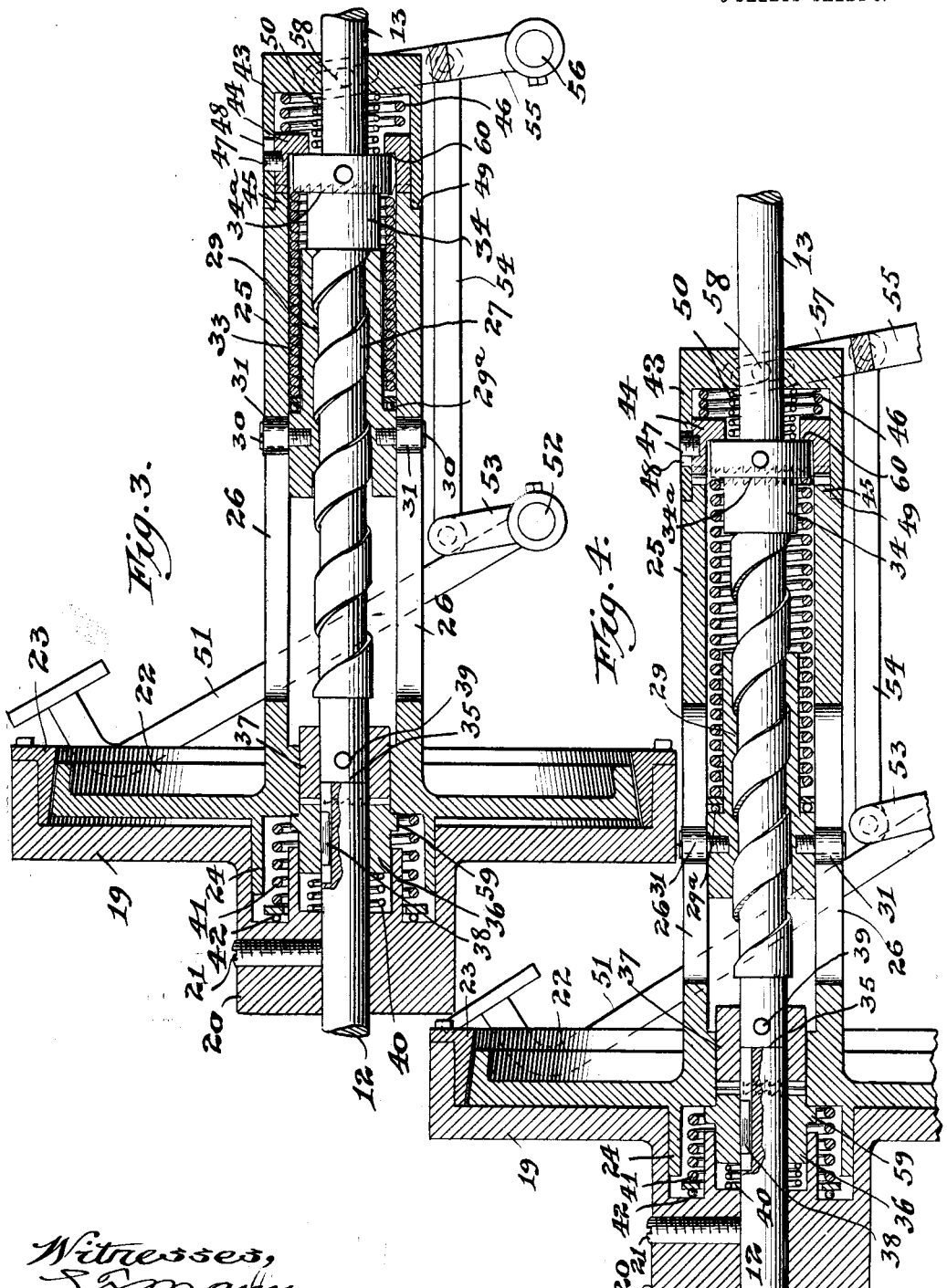

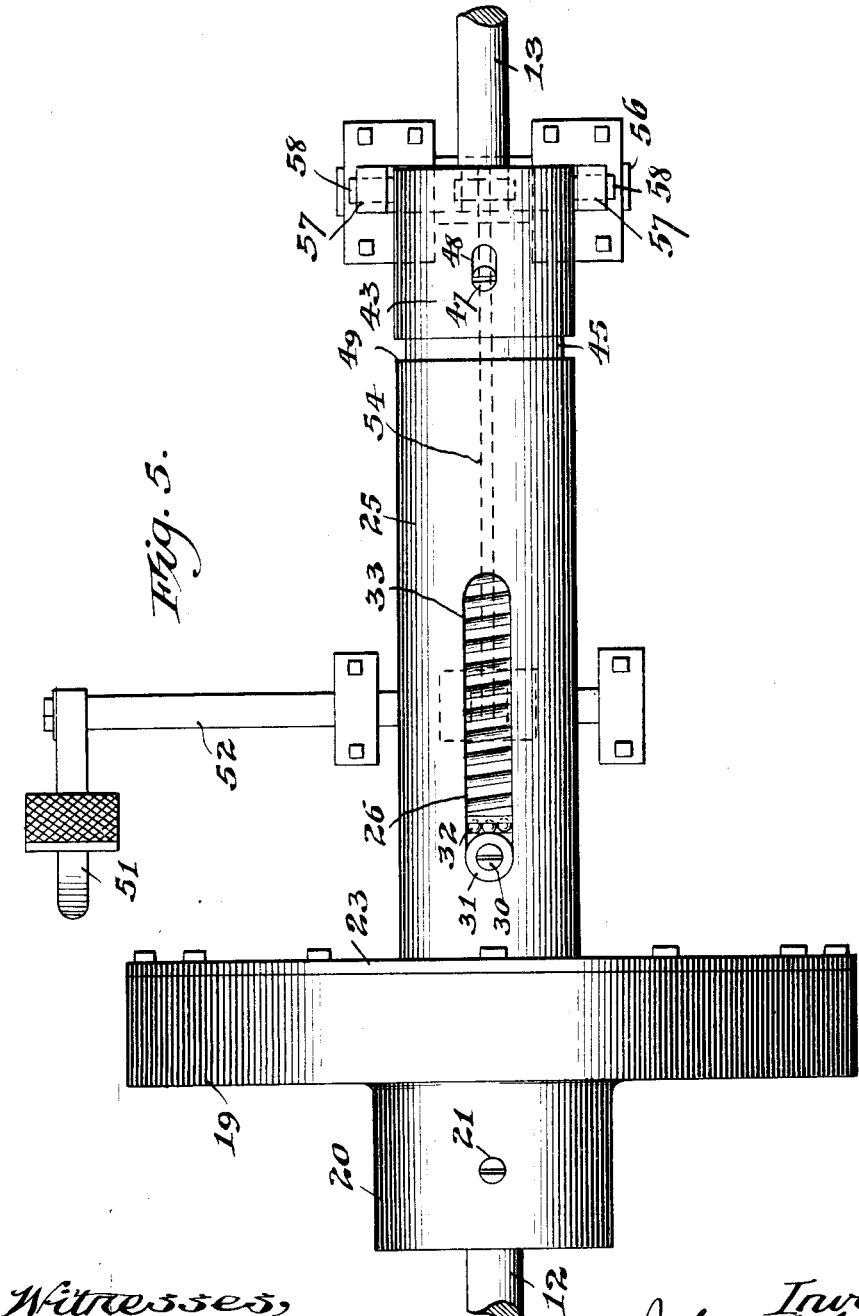

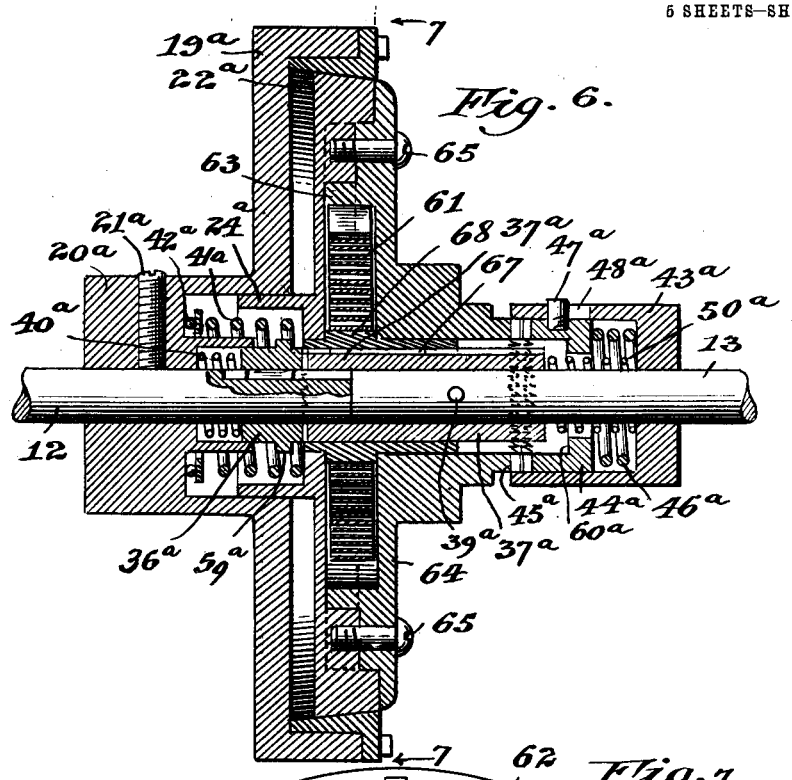
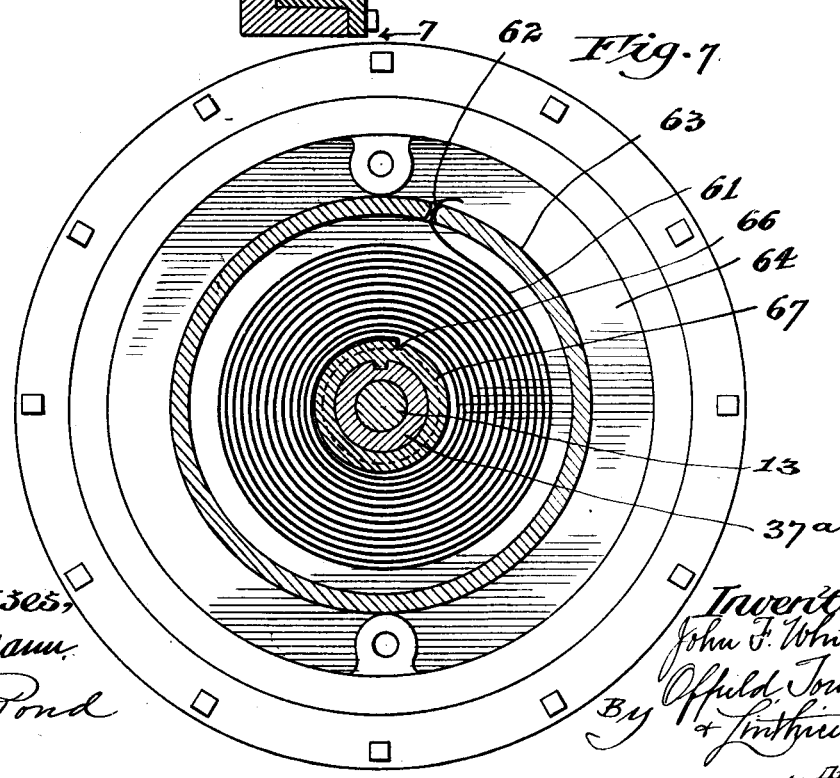

UNITED STATES PATENT OFFICE.

JOHN F. WHITE, OF BLOOMINGTON, ILLINOIS.

FLEXIBLE TRANSMISSION AND STARTING DEVICE FOR EXPLOSIVE-ENGINES.

1,104,593. Specification of Letters Patent. Patented July 21, 1914.

Application filed February 13, 1909. Serial No. 477,579.

*To all whom it may concern:*

Be it known that I, JOHN F. WHITE, a citizen of the United States, residing at Bloomington, in the county of McLean and State of Illinois, have invented certain new and useful Improvements in Flexible Transmission and Starting Devices for Explosive-Engines, of which the following is a specification.

This invention relates to power-transmitting and starting devices for explosive engines, and is chiefly intended for application and use in connection with the explosive motors of automobiles and other self-propelled vehicles.

Among the chief objects sought to be attained by the invention are, first, to provide a flexible or elastic yielding connection between the motor and the main drive-shaft of the mechanism, which shall relieve the usual clutch mechanism of wear, as well as obviate the sudden or jerky starting frequently incidental to the application of the main clutch, as likewise the continuous adjustment necessary; second, to provide an automatic starting device for setting the engine in operation, thus doing away with the usual "cranking" by hand required for the starting of an explosive engine; third, to provide a device wherein energy generated in the normal operation of the car and without the use of extra levers, brakes or other accessories, such as have heretofore been employed, may be stored, to be subsequently released for the purpose of effecting the starting of the motor; fourth, to provide a mechanism of the character mentioned wherein the results secured are obtained practically without the addition of extra weight, such auxiliary parts as are required constituting in effect parts of the fly-wheel or momentum device; fifth, to provide a device wherein energy is stored that is always available for use in restarting the motor when the latter may have been stalled or "killed" by the resistance of the load; sixth, to provide an automatic starter which shall also be capable of being started by hand in the possible event of a break-down or failure to turn the engine shaft a sufficient number of revolutions to effect the starting or in the event of any other circumstances requiring manual starting; seventh, to provide a device which will prevent the stalling or "killing" of the engine when shifting from a low to a higher speed by forming a cushion against which the motor acts in taking up the load at each change of speed; and, generally, to provide a simple, reliable, and largely automatic device of the character mentioned, requiring but little space, and easily capable of application to known makes of automobile transmissions.

In its main essential features my invention embodies, in connection with the usual engine shaft, a transmission shaft, a connection therebetween of a flexible or elastically yielding character, together with clutch mechanism through which such flexible connection is rendered effective to store energy for the purpose of restarting the engine, as well as to constitute a cushioned drive, relieving shocks upon the engine, the car, and the passengers, and conducing to smooth and easy running.

In the accompanying drawings I have illustrated two mechanical embodiments of the invention, both based on the same broad novel principle of operation, but differing somewhat in specific form; the use of which will be governed to some extent according to the amount of space available for the application of the device. In one of these forms, the drive is always transmitted through the spring cushion, while in the other it is transmitted through the spring cushion up to a certain extent, after which the drive may be practically continuous through the solid shaft.

The invention will be readily understood when considered in connection with the particular embodiments thereof herein shown; and referring to the drawings,—Figure 1 is a top plan view of the principal parts of an automobile chassis, illustrating the relative location therein of the device forming the subject-matter of this invention. Fig. 2 is a vertical longitudinal central section through one form of the device, showing the parts in initial or hand-cranking position. Fig. 3 is a view similar to Fig. 2, showing the parts in the positions assumed thereby at the inception of the automatic cranking operation. Fig. 4 is a view similar to Figs. 2 and 3, but showing a disconnected position of the parts such as that assumed during coasting or rounding corners. Fig. 5 is a top plan view of the form of the device shown in Figs. 2, 3 and 4, the positions illustrated corresponding to that shown by Fig. 2. Fig. 6 is a view similar to Fig. 2 of a modified form of the invention, the corresponding parts being shown in the same relative positions as in Fig. 2. Fig. 7 is a transverse section on the line 7—7 of Fig. 6.

Referring to Figs. 1 to 5, inclusive, 10 designates as an entirety the frame, 11 the engines, 12 the engine shaft, 13 the driving or propelling shaft, 14 the housing or casing of the usual variable speed gearing, 15 the rear axle, 16 the differential gear on the rear axle, 17 the rear springs, and 18 the rear wheels of an ordinary type of automobile chassis, in connection with which the device forming the subject-matter of this invention is chiefly, although not exclusively, intended for use.

My present flexible transmission and starting device, as applied to the driving gear of an automobile, such as is conventionally illustrated in Fig. 1, is located between the engine shaft 12 and the transmission or propelling shaft 13; and, in the form shown in Figs. 1 to 5, inclusive, comprises the following parts: 19 designates one member of the friction clutch which, through its hub 20 and a binding screw 21, is made rigid with the engine shaft 12. The other or movable clutch-member 22 has a tapered or beveled periphery adapted for coöperation with an internally beveled ring 23 that is bolted to the clutch-member 19; and in this connection I may state that the taper of the coöperating clutch-surfaces may be, and preferably is, of such a pitch as to practically eliminate slippage and cause the two clutch-members to positively lock when coupled. The hub 20 is chambered, and the clutch-member 22 has on its forward face an annular boss 24 that telescopes the chamber of the hub in a manner to accurately center and guide the slidable clutch-member 22. This latter has secured to or formed integral with its opposite faces an elongated hub or sleeve 25 that, for a portion of its length, is slotted on opposite sides, as shown at 26. Lying within and co-axial with the sleeve 25 is a cylindrical spiral 27 that is continuous or rigid with the transmission or propelling shaft 13, the spiral 27 thus lying between and in axial alinement with the opposed ends of the engine shaft 12 and the transmission shaft 13. Fitted to the spiral 27 to coöperate therewith is a somewhat elongated nut 29 that is splined to the sleeve 25 through the agency of radial projections 30 carrying rollers 31 which engage the slots 26. The nut 29 is formed with an annular shoulder 29ᵃ which, through an antifriction bearing 32, forms an abutment for one end of a strong spiral spring 33, the opposite end of which spring abuts against a similar annular shoulder 34ᵃ formed on a collar 34 that is keyed to the transmission shaft 13. From this it will be seen that a movement of the nut 29 endwise of the spiral 27, whether under or against the action of the spring, tends to set up a relative movement between the spiral and the sleeve. The abutting ends of the engine shaft 12 and spiral 27 are indicated at 35, and on these ends are mounted a pair of toothed clutch-members 36 and 37, the former being splined on the engine shaft, as shown at 38, and the latter being keyed on the spiral shaft, as shown at 39. The contiguous faces of these clutch-members have annular rows of clutch teeth so disposed that when the transmission shaft and spiral turn in a direction corresponding to the forward direction of rotation of the engine shaft, as indicated by the arrows, the clutch-member 37 drives the clutch-member 36 and the engine shaft to which the latter is splined; while, when the movement of rotation is in the opposite direction, such as occasionally occurs through accidental back-kick of the engine, the clutch-member 36 then drives the clutch-member 37 and the spiral to which the latter is keyed. The clutch-member 36 is normally coupled with the clutch-member 37 by a coil spring 40, and the friction clutch-members 19 and 22 are normally pressed into coupling relation by a spring 41 that surrounds the clutch-member 36, abutting at one end against the face of the disk 22 within the annular boss 24 thereof, and at its other end having an antifriction bearing at 42 against the bottom wall of the chambered hub. The toothed clutch-member 37 preferably projects forwardly of the end of the spiral shaft in a manner to form a bearing for the contiguous end of the engine shaft, the latter thus serving to accurately aline and center the clutch-members 36 and 37 and 19 and 22. In order that the nut 29, driven by the tension spring 33, may be effective to rotate the spiral shaft and, through the clutch 36, 37, drive the engine shaft in a forward direction, it is necessary to provide means for holding or locking the sleeve 25 against rotation when the clutch-disk 22 is disengaged from its mating member 19. This means, as herein shown, comprises a collar 43, loosely surrounding the transmission shaft 13, which collar is chambered at its inner end and receives a sliding clutch-member 44 that coöperates with a mating clutch-member 45 formed on the end of the sleeve 25. Said clutch-members have coöperating annular rows of teeth disposed in the same relation as the teeth of the clutch-members 36 and 37. The spring 46 normally tends to force the clutch-member 44 outwardly of the collar 43, but the sliding movement of clutch-member 44 is limited by a stop-pin 47 engaging a slot 48 formed in the wall of the collar. The clutch-member 45 is formed on a reduced end of the sleeve 25, over which the open end of the collar 43 is adapted to telescope, said reduced end forming an annular shoulder 49 with which the open end of the collar 43 coöperates in some positions of the mechanism. The clutch-members 44 and 45 are normally maintained uncoupled through the agency of a spring 50 acting between the collar 34 and the bottom of the chamber of the collar 43. The collar 43 is designed to be actuated in opposition to the spring 50, through the agency of a pedal lever 51 which, in practice, extends upwardly to a position readily accessible by the foot of the operator; the lower end of said lever being connected to a transverse rock-shaft 52, on which latter is an arm 53 connected by a link 54, and an arm 55 to a second rock-shaft 56, on the ends of which latter are upwardly extending arms 57 having slotted upper ends that engage laterally projecting pins 58 in the sides of the collar 43.

From the foregoing it will be seen that when the lever 51 is depressed to the position illustrated in Fig. 3, the collar 43 will be carried forwardly until its end engages the annular shoulder 49 whereupon the sleeve 25 and clutch-disk 22 will be moved to a position to uncouple the main friction clutch; and at the same time the two clutch-members 44 and 45 are coupled so that the sleeve 25 is thereby held against rotation and, through the projections 30 of the nut 29, becomes an abutment or anchor for the latter, so that the endwise travel of the nut, under the influence of its impelling spring 33, sets up a rotary motion of the spiral shaft, which is transmitted to the engine shaft through the clutch-members 37 and 36, all as shown in Fig. 3.

In some cases it is desirable, in order that the transmission shaft 28 may run entirely free of the engine shaft, and in order to avoid the chattering and wear which results from the travel of the clutch teeth over each other in the backward direction, to entirely separate the coöperating members of both of the toothed clutches. This is effected in the case of the clutch members 36 and 37 by means of an annular rib 59 on the clutch-member 36, which forms a shoulder adapted to be contacted by the forward end of the sleeve 25 when the latter has been moved inwardly to the extent indicated in Fig. 4, thus retracting the clutch-member 36 wholly from its mating member 37. In the case of the clutch-members 44 and 45, this same effect is produced through the agency of an internal rib 60 on the clutch-member 44 which, when the collar 43 is moved to the extreme position shown in Fig. 4, strikes the outer face of the collar 34, which latter forms a stop that holds the clutch-member against further travel, so that the continued forward movement of the sleeve 25 to the extreme position shown in Fig. 4 separates the clutch teeth.

The operation of the mechanism as thus far described is as follows: Figs. 2 and 5 illustrate the relative positions of the parts when the engine is first cranked, which is done by hand. At this time the transmission shaft is, of course, disconnected or in what is known as neutral position so as to be capable of turning freely without moving the car. The cranking of the engine shaft, through the main friction clutch, rotates both members of the latter and, the transmission shaft being free to turn, the friction effect of the clutch-members 36 and 37, together with that of the nut 29 on the spiral 27, turns said transmission shaft idly, so that the parts all revolve together. The operator, then, from his position in the car, throws the transmission from neutral into low or other selected speed, which places a resistance on the transmission shaft, thus causing the nut to run up on the spiral and compress the cushion spring 33. This cushioning or tensioning effect, of course, gradually increases in strength until it is sufficiently strong to cause the nut to propel the car through the spiral against the resistance of the load, which may occur before the spring is tensioned to its limit, or, in case the spring is so tensioned, occurs when the nut has traveled into engagement with the stationary collar 34, whereupon the drive becomes a solid one. In order next to further accelerate the speed of the car, which is done by throwing the transmission to a higher speed, the foot lever 51 is depressed to the limit of its movement, as indicated in Fig. 4, which disconnects all the clutches and leaves the transmission shaft free so that the shifting can be effected without danger of injury to the transmission gears. This action, by disconnecting all of the clutches both from the engine and from the non-rotating shifting collar 43, permits the spring to expand, causing the nut 29 to run back to starting position; and, as the freed transmission shaft is lighter, as regards its rotative movement, than the member 22 of the friction clutch (which latter is under a certain degree of acquired momentum, it will idly turn the transmission shaft in its normal or forward direction of movement. The operator, having effected the shifting of the transmission gears, say from low speed to intermediate speed, thereupon releases the foot lever, whereupon the spring 41 instantly acts to reëstablish driving connection through the friction clutch, the motor first retensioning the spring 33 and thereupon driving the car in the manner already described at the increased speed. The same operations are performed in shifting the transmission to successively higher speeds.

It will thus be seen that two important functions are performed by the device; one of these being the starting or acceleration of speed of the car through a cushioned or flexible connection, whereby the starting or accelerating strain is rendered easy and gradual, thus avoiding jerking of the car, as well as danger of "killing" the engine; the other being the storing, when the motor is first started and when each shift of speed occurs, of a supply of energy (represented by the tension spring) sufficient to effect the automatic starting of the motor whenever the same may get stalled for any reason whatever. For instance, in case the engine becomes stalled by reason of an excessive load, by then throwing the transmission to neutral position, thus freeing the transmission shaft from the load, and then depressing the foot lever 51 sufficiently to disconnect the friction clutch and engage the clutch-members 44 and 45, as shown in Fig. 3, the expansion of the spring effects, through the nut and spiral, the turning of the transmission shaft in a forward direction, the latter, through the clutch-members 37 and 36, thus cranking the engine. Again, it is well understood that when running at high speed the sparking is advanced so as to occur slightly before the piston reaches the extreme limit of its compression stroke, in order to make most effective the force of the explosion. It occasionally happens, through carelessness, that an operator attempts to crank the engine without having properly adjusted the sparking to insure a forward drive, which may result in a "back-kick." In the case of the present device, should a "back-kick" occur while cranking through the pedal lever, the latter being in the intermediate position shown in Fig. 3, the only result would be to retension the spring, through the back turning of the spiral effected through the engagement of the clutch-members 36 and 37 (the clutch 44, 45 holding the sleeve 25 against rotation); and as soon as the resistance of the spring had equaled and neutralized the backward rotative movement of the engine shaft, the spring would react to drive the engine shaft in the opposite or forward direction, thus re-cranking the engine.

The same principle of operation is embodied in a slightly modified form of mechanism shown in Figs. 6 and 7. In these latter views I have designated such parts as are duplicates of corresponding parts in Figs. 1 to 5, inclusive, by the same reference numerals with an alphabetical exponent. In this form of mechanism, however, the spring energy, instead of being stored and given out through the agency of a nut and spiral, is stored and given out directly through the agency of rotary members to which the inner and outer ends of a flat helical spring are respectively connected. In the drawings, 61 designates the spring, the outer end of which is anchored at 62 to an annular rib 63 formed on the inner face of a disk 64 that is secured as by screws 65, to the clutch-member 22$^a$. The inner end of said spring is anchored at 66 to a sleeve 67 that is splined on the clutch-member 37$^a$ keyed to the transmission shaft 28. Said sleeve 67 has an external annular rib 68 that is engaged on one side by the clutch-disk 64 and, on its opposite side, engages the clutch-member 22$^a$, thereby confining the sleeve 67 endwise between the members 64 and 22$^a$; the left-hand end of the sleeve 67 projecting over the teeth of the clutch-member 37$^a$ in a manner to engage the rib 59$^a$ of the clutch-member 36$^a$ to separate said clutch-members in the manner already described. With this form of the device the same clutch-operating means (foot lever 51 and connections to the collar 43$^a$) are employed as in the form already described. The device is first cranked by hand with the transmission gear in neutral position, leaving the transmission shaft 13 free to rotate; and, as soon as the engine is started, the resistance of the load is placed on the shaft 13, which arrests the rotation of the sleeve 67 to which the inner end of the spring is anchored, thus causing the spring to wind up. As soon as the spring has been wound to a point where its resistance equals the resistance of the load, the vehicle begins to move, and the drive continues directly through the spring. When necessary to re-crank the engine, the outer end of the spring is locked against movement by coupling together the clutch-members 44$^a$ and 45$^a$ (the shaft 13 having been freed by throwing the transmission gears into neutral position), whereupon the stored energy of the spring acts through its inner end to rotate the sleeve 67 and, through the clutch-members 37$^a$ and 36$^a$, re-crank the engine. By throwing the foot lever to the limit of its movement, both of the toothed clutches, as well as the friction clutch, are uncoupled, thus leaving the machine free to coast without chatter or wear of the clutch teeth. In short, any and all of the operations set forth in connection with the description of the form of the invention shown in Figs. 1 to 5, inclusive, are capable of being performed with the device shown in Figs. 6 and 7; the only difference in manner of operation being that, in the latter form the entire stored energy of the spring is given out in the cranking operation, while in the form shown in Figs. 1 to 5, inclusive, the amount of spring energy given out will depend upon the abruptness or otherwise of the curve of the spiral, which latter can be figured according to the strength of the spring employed and the amount of energy required to properly crank the engine, so that it will give substantially only the required rotative effort. When the construction of Figs. 6 and 7 is employed, however, any desired strength of spring may be used. For instance, if a spring affording only sufficient energy to insure the cranking of the engine is employed, it will first be wound up to its limit, the propulsive effort of the engine being then exerted through the solid spring without any injury to the latter. In other words, if a spring possessing a strength equal to or exceeding the maximum resistance of the load is employed, it will afford a continuous cushion effect between the engine and the transmission shaft, and, if the energy exceeds that desirable for cranking purposes, it can be diminished or reduced by easing the clutch-member 22$^a$ back into engagement with its companion clutch-member 19$^a$, thus imposing a braking action on the spring.

It is well known that in the case of motor vehicles driven through the rear axle by a differential gear, travel on a curved path, as in rounding a corner, imposes a severe back pressure on the differential gear, unless the propelling or transmission shaft is entirely disconnected from the motor. This is easily and simply effected in the present case by simply throwing the foot lever to the limit of its movement, thus separating all of the connections between the motor shaft and the transmission shaft, leaving the latter free to idle, the complete separation of the ratchet clutches also obviating any objectionable noise or chatter, and rendering the operation a noiseless one.

Another noteworthy advantage which the present invention affords resides in the fact that slip and lost motion is not required in the main friction clutch. In fact, the clutch surfaces may be put at such an angle that the clutch-members will practically lock at once upon coming together, the spring cushion affording the requisite ease of action in starting or changing the speed of the car, which is absolutely necessary.

It will be observed with more particular reference to Figs. 1 to 5 inclusive that the two members of the main friction clutch, together with the hub and sleeve portions thereof, constitute in effect a balanced flywheel, such as is required in all explosive motor mechanisms of this type. In other words, the invention in effect adapts the ordinary balance or fly-wheel, through a suitable modification thereof, to effect its purpose, and without involving additional weight. The gradual and cushioned starting movement which the device of the invention effects also saves injury to the tires, as it avoids the stretching and rending strain imposed on the fabric of the tires in a sudden or jerky start.

It will be evident to those skilled in the art that the underlying principle of the invention is by no means limited to the specific details of mechanism herein shown and described, which latter may be considerably modified in respect to both construction and relative arrangement without involving any departure from, or sacrificing any of the advantages of, the invention.

I am aware that it has heretofore been proposed to store the momentum energy of the vehicle through the agency of a spring, and later impart such energy to the engine shaft for purposes of cranking. My invention is, however, sharply distinguished from all such devices in that the spring energy is stored, not by momentum of the vehicle, but by the motor itself, through a flexible drive, so that my device is available not merely for restarting the motor, but possesses the further valuable function of cushioning the drive and relieving the car and passengers of the sudden jerks and shocks so frequently incident to an abrupt start or acceleration resulting from a sudden locking or coupling of the main friction clutch.

I claim:

1. The combination of an engine shaft, a transmission shaft, and flexible transmission and starting mechanism interposed between said shafts, including a clutch member having a hub sleeved upon and secured to the engine shaft, a coöperating movable clutch member, the hub of the first mentioned clutch member having a chambered portion and said movable clutch member having an annular boss positioned within said chambered portion of the hub, and a spring connection interposed between said movable clutch member and transmission shaft.

2. The combination of an engine shaft, a transmission shaft, and flexible transmission and starting mechanism interposed between said shafts, including a friction clutch member having a hub sleeved upon and secured to the engine shaft, a coöperating movable clutch member, the hub of the first mentioned clutch member having a chambered portion and said movable clutch member having an annular boss positioned within said chambered portion of the hub, and a spring connection interposed between said movable clutch member and transmission shaft, the said mechanism being constructed and arranged whereby to form an evenly balanced fly wheel.

3. The combination of an engine shaft, a transmission shaft, and flexible transmission and starting mechanism interposed between said shafts, including a friction clutch member having a hub sleeved upon and secured to the engine shaft, a coöperating movable clutch member, the hub of the first mentioned clutch member having a chambered portion and said movable clutch member having an annular boss positioned within said chambered portion of the hub, a spring connection interposed between said movable clutch member and transmission shaft, and an interlocking connection between the two shafts operable to impart movement from the transmission shaft to the engine shaft.

4. The combination with an engine shaft and a transmission shaft, of a clutch one member whereof is rigid with said engine shaft, a flexible member between the other member of said clutch and said transmission shaft and engaging directly a fixed part of the latter, the flexible member being adapted to be placed under tension from the engine shaft during the initial part of its turning movement, and means whereby when said clutch is uncoupled the energy thus stored is subsequently released and exerted upon said engine shaft.

5. The combination with an engine shaft and a transmission shaft, of a clutch one member whereof is rigid with said engine shaft, a spring cushion connection between the other member of said clutch and said transmission shaft, means whereby said other member of the clutch is held against rotation when said clutch-members are uncoupled, and means whereby the stored energy of said spring cushion is exerted upon said engine shaft to turn the latter in a forward direction, while said other member of the clutch is held against rotation.

6. The combination with an engine shaft and a transmission shaft, of a double clutch connection therebetween, means for uncoupling one clutch to effect cranking of the engine, and means actuated by said last mentioned means for uncoupling both clutches to disconnect said shafts.

7. The combination with an engine shaft and a transmission shaft, of two clutch connections between said shafts, one of said clutch connections being operative to actuate the engine shaft from the transmission shaft, and the other of said clutch connections being flexibly joined to the transmission shaft, means for uncoupling said last-named clutch to effect cranking of the engine, and means for uncoupling both of said clutches whereby to free the transmission shaft from the engine shaft.

8. The combination with an engine shaft and a transmission shaft, of a clutch one member whereof is keyed to said engine shaft, a spiral rigid with said transmission shaft, a nut on said spiral slidably and non-rotatably mounted relative to the other member of said clutch, elastic means for forcing said nut lengthwise of said spiral, a second clutch between said engine and transmission shafts, and means to hold said other clutch-member against turning when released.

9. The combination with an engine shaft and a transmission shaft, of a clutch one member whereof is keyed to said engine shaft, a spiral rigid with said transmission shaft, a nut on said spiral slidably and non-rotatably mounted relative to the other member of said clutch, elastic means for forcing said nut lengthwise of said spiral, a second clutch between said engine and transmission shafts, means to hold said other clutch-member against turning when released, and means for uncoupling said second clutch whereby to disconnect said shafts.

10. The combination with an engine shaft and a transmission shaft, of a clutch one member whereof is keyed to said engine shaft and the other member whereof has a sleeve, a spiral rigid with said transmission shaft and lying within said sleeve, a nut on said spiral splined to said sleeve, a spring abutting at one end against said nut, an abutment member for the other end of said spring, a second clutch between said engine and transmission shafts, and means to hold said sleeve against turning when said first-named clutch is uncoupled.

11. The combination with an engine shaft and a transmission shaft, of a clutch one member whereof is keyed to said engine shaft and the other member whereof has a sleeve, a spiral rigid with said transmission shaft and lying within said sleeve, a nut on said spiral splined to said sleeve, a spring abutting at one end against said nut, an abutment member for the other end of said spring, a second clutch between said engine and transmission shafts, a third normally uncoupled clutch between said sleeve and a non-rotatable member, and means for first coupling said last-named clutch and then uncoupling said first-named clutch.

12. The combination with an engine shaft and a transmission shaft, of a clutch one member whereof is keyed to said engine shaft and the other member whereof has a sleeve, a spiral rigid with said transmission shaft and lying within said sleeve, a nut on said spiral splined to said sleeve, a spring abutting at one end against said nut, an abutment member for the other end of said spring, a second clutch between said engine and transmission shafts, adapted to transmit movement from the latter to the former, a third normally uncoupled clutch between said sleeve and a non-rotatable member, and means for successively coupling said last-named clutch, uncoupling said first-named clutch, and uncoupling said second clutch.

13. The combination with an explosive motor and a driven shaft, of a clutch and starting mechanism therebetween, constituting an evenly balanced fly-wheel, said clutch including a clutch wheel rigid with the shaft, a coöperating clutch wheel, and a spring independent of and operatively associated at one end with the coöperating clutch wheel and operatively connected with said shaft at its opposite end.

14. The combination with an engine shaft and a transmission shaft, of a clutch comprising coöperating disk wheels one member whereof is rigid with said engine shaft, a flexible member between the other member of said clutch and said transmission shaft and engaging directly a fixed part of the latter, the flexible member being adapted to be placed under tension from the engine shaft during the initial part of its turning movement, and means whereby when said clutch is uncoupled the energy thus stored is subsequently released and exerted upon said engine shaft, the said flexible member being free from connection with the clutch members.

15. The combination of an engine shaft, two clutch members fixed thereto, a transmission shaft, a clutch on the latter arranged to engage one of the first mentioned clutch members, an auxiliary clutch arranged to engage the other of the first mentioned clutch members, and a yieldable connection between the auxiliary clutch and the transmission shaft.

16. The combination of an engine shaft, two clutch members fixed thereto, a transmission shaft, a clutch on the latter arranged to engage one of the first mentioned clutch members, an auxiliary clutch arranged to engage the other of the first mentioned clutch members, a spring for yieldably connecting the auxiliary clutch and transmission shaft, and means for uncoupling the auxiliary clutch to effect cranking of the engine.

17. The combination of an engine shaft, two clutch members fixed thereto, a transmission shaft, a clutch on the latter arranged to engage one of the first mentioned clutch members, an auxiliary clutch arranged to engage the other of the first mentioned clutch members, a spring for yieldably connecting the auxiliary clutch and transmission shaft, means whereby the spring is tensioned from the engine shaft, and means whereby the stored energy of the spring is subsequently exerted upon the engine shaft in a manner to impart a forward turning movement thereto.

18. The combination of an engine shaft, a transmission shaft, a yieldable connection therebetween, to impart movement to the transmission shaft from the engine shaft and a non-yielding connection between the transmission and engine shafts for imparting movement to the engine shaft from the transmission shaft.

19. The combination of an engine shaft, a transmission shaft, a yieldable connection therebetween, to impart movement to the transmission shaft from the engine shaft and a direct non-yielding connection between the transmission and engine shafts for imparting movement to the engine shaft from the transmission shaft.

20. The combination of an engine shaft, a transmission shaft, a yieldable connection therebetween, to impart movement to the transmission shaft from the engine shaft and a direct non-yielding connection between the transmission and engine shafts for imparting movement to the engine shaft from the transmission shaft, said connection including coöperating clutch members secured to the respective shafts.

21. The combination with an engine shaft, a disk shaped member secured thereto having a clutch part, an auxiliary disk shaped member having a coöperating clutch part, a transmission shaft, a flexible connection between the auxiliary disk member and the transmission shaft, and an interlocking connection between the two shafts operable to transmit movement from the transmission shaft to the engine shaft.

22. The combination with an engine shaft, a disk shaped member secured thereto, a peripheral flange on the disk shaped member forming a clutch part, an auxiliary disk shaped member having a peripheral flange forming a coöperating clutch part, a transmission shaft, a flexible connection between the auxiliary disk member and the transmission shaft, and an interlocking connection between the two shafts operable to transmit movement from the transmission shaft to the engine shaft.

23. The combination with an engine shaft, a disk shaped member secured thereto, a peripheral flange on the disk member forming a clutch part, an auxiliary disk shaped member having a peripheral flange forming a coöperating clutch part, a transmission shaft, a flexible connection between the auxiliary disk member and the transmission shaft, and an interlocking connection between the two shafts operable to transmit movement from the transmission shaft to the engine shaft, means for moving the auxiliary disk member to release the coöperating clutch part, and a centering device for said auxiliary disk member.

24. The combination of an engine shaft, a transmission shaft, coöperating clutch members, a slidable member mounted on the transmission shaft, a flexible engagement between the slidable member and transmission shaft, one of said clutch members being fixed to the engine shaft, and means whereby the same through its coöperating clutch member will impart sliding movement to the slidable member to place the spring under tension, an auxiliary clutch connection between the engine and transmission shafts, and means whereby the stored energy of the spring will impart motion to the engine shaft from the transmission shaft.

25. The combination with an engine shaft and a transmission shaft, of a clutch one member whereof is keyed to said engine shaft, a nut mounted on the transmission shaft and being slidable and non-rotatably mounted relative to the other member of said clutch, elastic means for forcing said nut lengthwise of the transmission shaft, a second clutch between said engine and transmission shafts, and means to hold said other clutch member against turning when released.

26. The combination with an engine shaft and a transmission shaft, of a clutch one member whreof is keyed to said engine shaft and the other member whereof has a flexible connection with the transmission shaft, a second clutch between said engine and transmission shafts for imparting movement from the transmission shaft to the engine shaft, a third normally uncoupled clutch for said flexible connection, and means for first coupling said last named clutch and then uncoupling said first named clutch.

27. The combination with an engine shaft and a transmission shaft, of a preliminary flexible power transmitting connection therebetween including normally disengaged locking surfaces operable to engage one another and establish a fixed connection therebetween.

28. The combination with an engine shaft and a transmission shaft, of a flexible power transmitting connection therebetween, and means whereby said flexible connection is tensioned from the engine shaft to impart movement to the transmission shaft, and means whereby said flexible connection is converted into a fixed connection, including opposed locking surfaces.

29. The combination with an explosive motor having a drive shaft, of a driving shaft, an interposed transmission shaft, a connection between the drive and transmission shafts whereby the latter is actuated to operate the drive shaft, said connection including a spring, means whereby said spring is adapted to impart initial movement to the drive shaft, and means movable with the spring for clutching the shafts together after the spring has moved a predetermined distance.

30. The combination of an engine shaft, a transmission shaft, coöperating clutch members interposed between the shafts, a flexible connection between one member of the clutch and the transmission shaft whereby when the clutch members are in engagement the transmission shaft is operated by the engine shaft, an auxiliary connection between the shafts, and means for releasing the clutching members whereby the yielding connection will operate to impart movement to the engine shaft through said auxiliary connection.

31. The combination of an engine shaft, a transmission shaft, a mechanical flexible connection between the two, means whereby the drive is transmitted through the flexible connection to a certain extent, and means movable with the flexible member for establishing a rigid connection between the engine and transmission shafts and said flexible connection being adapted to store energy and subsequently release the same after starting the engine.

32. The combination of an engine shaft, a transmission shaft, coöperating clutch members interposed between the shafts, a flexible connection between one member of the clutch and the transmission shaft whereby when the clutch members are in engagement the transmission shaft is operated by the engine shaft, an auxiliary connection between the shafts, means for releasing the clutching members whereby the yielding connection will operate to impart movement to the engine shaft through said auxiliary connection, and means for releasing said auxiliary connection.

33. The combination of an engine shaft, a transmission shaft, coöperating clutch members interposed between the shafts, a flexible connection between one member of the clutch and the transmission shaft whereby when the clutch members are in engagement the transmission shaft is operated by the engine shaft, an auxiliary connection between the shafts, said auxiliary connection being releasable, means whereby when the clutch members are released the yielding connection will operate to impart motion to the engine shaft through said auxiliary connection, and a common means for releasing said clutch members and auxiliary connection.

JOHN F. WHITE.

Witnesses:
SAMUEL N. POND,
ALLEN W. MOORE.